(12) United States Patent
Nishimura et al.

(10) Patent No.: US 11,989,227 B2
(45) Date of Patent: May 21, 2024

(54) IMAGE SEARCH SYSTEM, IMAGE SEARCH METHOD, AND PROGRAM

(71) Applicant: NEC Corporation, Tokyo (JP)

(72) Inventors: Shoji Nishimura, Tokyo (JP); Tingting Dong, Tokyo (JP)

(73) Assignee: NEC CORPORATION, Tokyo (JP)

( * ) Notice: Subject to any disclaimer, the term of this patent is extended or adjusted under 35 U.S.C. 154(b) by 604 days.

(21) Appl. No.: 17/273,068

(22) PCT Filed: Sep. 5, 2019

(86) PCT No.: PCT/JP2019/034928
§ 371 (c)(1),
(2) Date: Mar. 3, 2021

(87) PCT Pub. No.: WO2020/050354
PCT Pub. Date: Mar. 12, 2020

(65) Prior Publication Data
US 2021/0342390 A1    Nov. 4, 2021

(30) Foreign Application Priority Data

Sep. 5, 2018    (JP) .................................. 2018-165643

(51) Int. Cl.
*G06F 16/583*       (2019.01)
*G06F 3/04842*     (2022.01)
(Continued)

(52) U.S. Cl.
CPC ........ *G06F 16/583* (2019.01); *G06F 3/04842* (2013.01); *G06F 16/532* (2019.01);
(Continued)

(58) Field of Classification Search
None
See application file for complete search history.

(56) References Cited

U.S. PATENT DOCUMENTS

2005/0275662 A1*  12/2005  DiStefano, III ...... G06F 40/106
                                                                    345/619
2015/0324394 A1*  11/2015  Becker ................ G06F 16/5866
                                                                    707/733

FOREIGN PATENT DOCUMENTS

CN        103440348 A    * 12/2013
JP        2005-303396 A    10/2005
                (Continued)

OTHER PUBLICATIONS

Japanese Office Action for JP Application No. 2020-541292 dated Oct. 11, 2022 with English Translation.
(Continued)

*Primary Examiner* — Jiangeng Sun

(57) ABSTRACT

An image search system (1) is provided with: a search key information acquisition unit (110) that acquires color specifying information indicating a plurality of colors and reference information indicating a reference of proportions of the plurality of colors being occupied in an image area; a specified color proportion information acquisition unit (120) that acquires specified color proportion information indicating proportions of the plurality of colors associated with the color specifying information, being occupied in an image to be processed; and an image search unit (130) that identifies whether the image to be processed is a search target image, based on the specified color proportion information and the reference information.

16 Claims, 14 Drawing Sheets

(51) Int. Cl.
    *G06F 16/532*     (2019.01)
    *G06F 16/538*     (2019.01)
    *G06T 7/90*     (2017.01)
    *G06V 10/56*     (2022.01)

(52) U.S. Cl.
    CPC ........ *G06F 16/538* (2019.01); *G06F 16/5838* (2019.01); *G06T 7/90* (2017.01); *G06V 10/56* (2022.01)

(56) References Cited

FOREIGN PATENT DOCUMENTS

| | | | | |
|---|---|---|---|---|
| JP | 4336950 B2 | * | 9/2009 | ........... G06K 9/4652 |
| JP | 2014-085852 A | | 5/2014 | |
| JP | 2014238788 A | * | 12/2014 | |
| JP | 2016-218547 A | | 12/2016 | |
| WO | 2013/005262 A1 | | 1/2013 | |
| WO | WO-2013005262 A1 | * | 1/2013 | ......... G06F 17/3025 |

OTHER PUBLICATIONS

International Search Report for PCT Application No. PCT/JP2019/034928, dated Nov. 19, 2019.

* cited by examiner

IMAGE SEARCH SYSTEM, IMAGE SEARCH METHOD, AND PROGRAM

This application is a National Stage Entry of PCT/JP2019/034928 filed on Sep. 5, 2019, which claims priority from Japanese Patent Application 2018-165643 filed on Sep. 5, 2018, the contents of all of which are incorporated herein by reference, in their entirety.

TECHNICAL FIELD

The present invention relates to an image search technique.

BACKGROUND ART

There is a technique for finding an image of a search target object by using an external feature such as a color of the search target object. For example, PTL 1 described below discloses a technique of accepting specification input indicating two or more colors and a proportion of each of the two or more colors, extracting, from an image database, an album artwork including the specified two or more colors by a specified proportion or more, and providing a user with a result of the extraction.

CITATION LIST

Patent Literature

[PTL 1] International Publication No. WO2013/005262

SUMMARY OF INVENTION

Technical Problem

In the technique disclosed in above-described PTL 1, when a plurality of colors are specified as a condition for searching for an image of a search target object, a proportion is specified for each of the plurality of colors. Therefore, when a user searches an image of a search target object having a plurality of colors, the user has to appropriately set a proportion of each color. A technique for enabling more easy search of a target image is desired.

The present invention has been made in view of the above-described problem. One of objects of the present invention is to provide a technique for enabling easy search of a target image, when an image is searched for based on a color.

Solution to Problem

An image search system according to the present invention includes:
 a search key information acquisition unit that acquires color specifying information indicating a plurality of colors and reference information indicating a reference of proportions of the plurality of colors being occupied in an image area;
 a specified color proportion information acquisition unit that acquires specified color proportion information indicating proportions of the plurality of colors associated with the color specifying information, being occupied in an image to be processed; and
 an image search unit that identifies whether the image to be processed is a search target image, based on the specified color proportion information and the reference information.

An image search method according to the present invention includes:
 by a computer,
 acquiring color specifying information indicating a plurality of colors and reference information indicating a reference of proportions of the plurality of colors being occupied in an image area;
 acquiring specified color proportion information indicating proportions of the plurality of colors associated with the color specifying information, being occupied in an image to be processed; and
 identifying whether the image to be processed is a search target image, based on the specified color proportion information and the reference information.

A program according to the present invention causes a computer to execute the above-described image search method.

Advantageous Effects of Invention

The present invention enables easy search of a target image, when an image is searched for based on a color.

BRIEF DESCRIPTION OF DRAWINGS

The above-described object, the other objects, features, and advantages will become more apparent from suitable example embodiments described below and the following accompanying drawings.

EXAMPLE EMBODIMENT

In the following, example embodiments according to the present invention are described with reference to the drawings. Note that, in all of the drawings, similar components have similar reference signs, and description thereof is omitted as necessary. Further, in each block diagram, each block represents a configuration of a functional unit instead of a configuration of a hardware unit unless otherwise specifically described.

<Outline>

Figure 1:
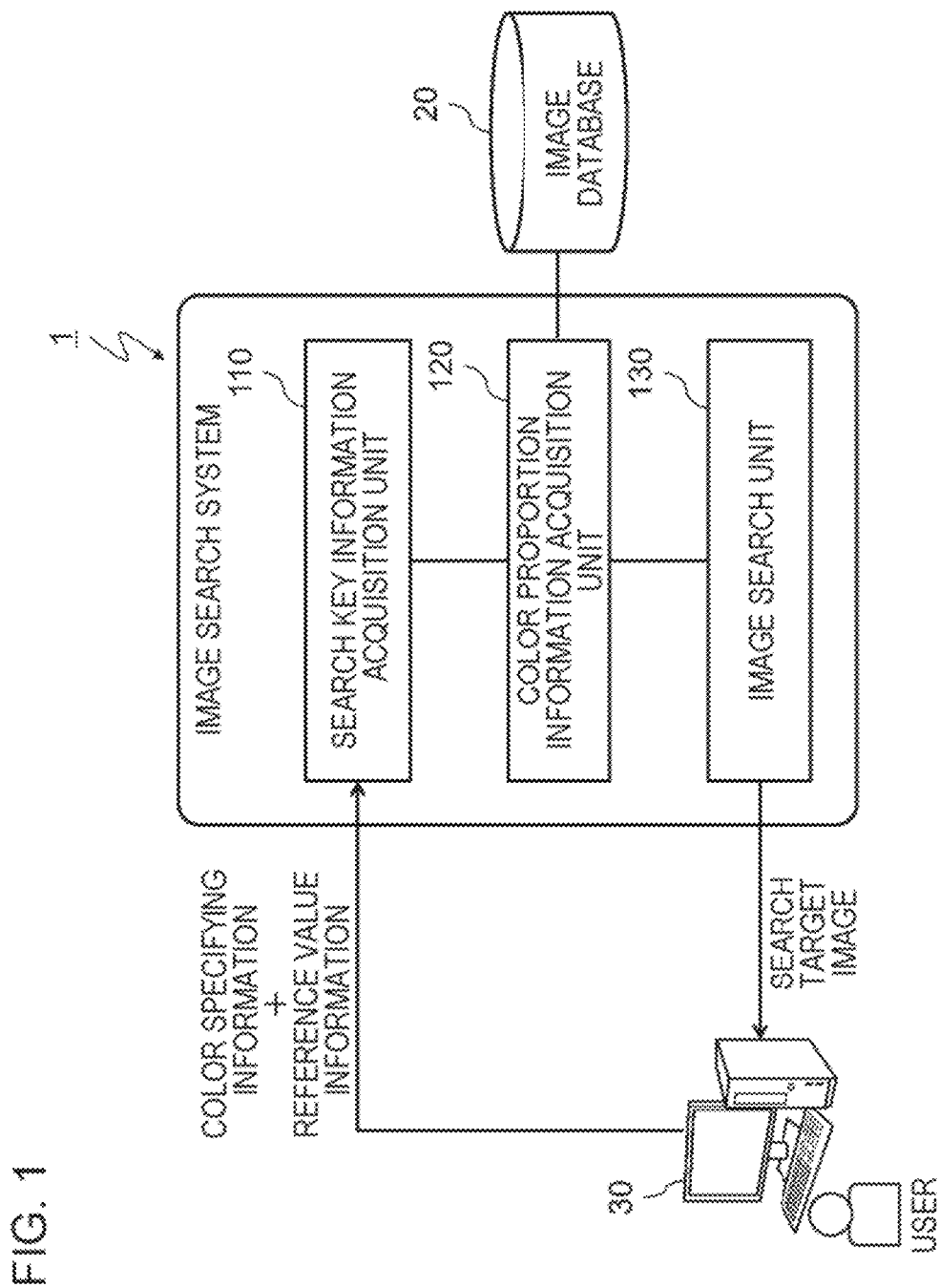
FIG. 1 is a diagram schematically illustrating a flow of processing to be performed by an image search system according to the present invention.

An outline of processing to be performed by an image search system 1 according to the present invention is described with reference to FIG. 1. FIG. 1 is a diagram schematically illustrating a flow of the processing to be performed by the image search system 1 according to the present invention.

First, the image search system 1 includes a search key information acquisition unit 110, a specified color proportion information acquisition unit 120, and an image search unit 130. The search key information acquisition unit 110 acquires color specifying information and reference information. The color specifying information and the reference information are information for determining a search target image. The color specifying information indicates one or a plurality of colors specified by a user. Note that, herein, it is possible to count the number (types) of colors, based on a value when the color is expressed by any color system. The reference information indicates a reference of a proportion of one or a plurality of colors specified by a user, which is occupied in an image area. Herein, when a plurality of colors are specified by the color specifying information, the reference information is set as information indicating a reference of the entirety of the plurality of colors. For example, when a reddish color and a bluish color are specified by the color specifying information, the reference information is set as information indicating a reference with respect to a sum of a proportion of the reddish color and a proportion of the bluish color. The color specifying information and the reference information are generated based on information input to a user terminal 30 by a user, and transmitted to the search key information acquisition unit 110.

The specified color proportion information acquisition unit 120 acquires specified color proportion information of an image to be processed by using the color specifying information acquired by the search key information acquisition unit 110. The specified color proportion information indicates a proportion of one or a plurality of colors associated with the color specifying information, which is occupied in the image to be processed.

Herein, the image to be processed is stored in an image database 20. The image to be processed is an image of a search target object (e.g., a person, a vehicle, a product, or the like). The image to be processed may be a partial image acquired by cutting a partial area of an original image into a predetermined shape. For example, the image to be processed may be generated by cutting, from video data (original image) of a surveillance camera or the like, an area recognized as a search target object such as a person or a vehicle. Note that the shape of the image to be processed is not specifically limited. The shape of the image to be processed may be, for example, a polygonal shape such as a rectangular shape, or may be a shape such as a circular shape or an elliptical shape. When the image to be processed is a partial image, the image database 20 may store, for each image to be processed, information indicating a correlation with respect to an original image (e.g., which partial area of the original image, the image to be processed is associated with, and the like).

The image search unit 130 identifies whether the image to be processed is a search target image, based on the specified color proportion information acquired by the specified color proportion information acquisition unit 120 and the reference information acquired by the search key information acquisition unit 110. For example, when a proportion of a specified color occupied in a certain image to be processed is equal to or higher than a reference indicated by the reference information, or when the proportion lies within a reference range indicated by the reference information, the image search unit 130 can identify the image to be processed as a search target image. Then, the image search unit 130 outputs, to an output apparatus (e.g., the user terminal 30, or the like), an identification result of the search target image based on the color specifying information and the reference information input to the search key information acquisition unit 110.

<Operation and Advantageous Effect>

As described above, the image search system 1 according to the present invention allows a user to search a target image by a simple operation of specifying a color and a proportion of the color. When a plurality of colors are specified, one reference is set for all of these colors, instead for each color. Thus, when an image of an object having a plurality of colors is searched for, a user does not have to strictly specify a condition for searching for an image, and usability is improved. The image search system 1 according to the present invention allows a user to intuitively control a condition (such as a range or a proportion of a color) for identifying a search target image. In other words, it becomes possible to accurately convey, to the image search system 1, what image a user is looking for, and consequently, an advantageous effect of improving accuracy of searching for an image desired by a user can be expected.

First Example Embodiment

Functional Configuration Example

Figure 2:
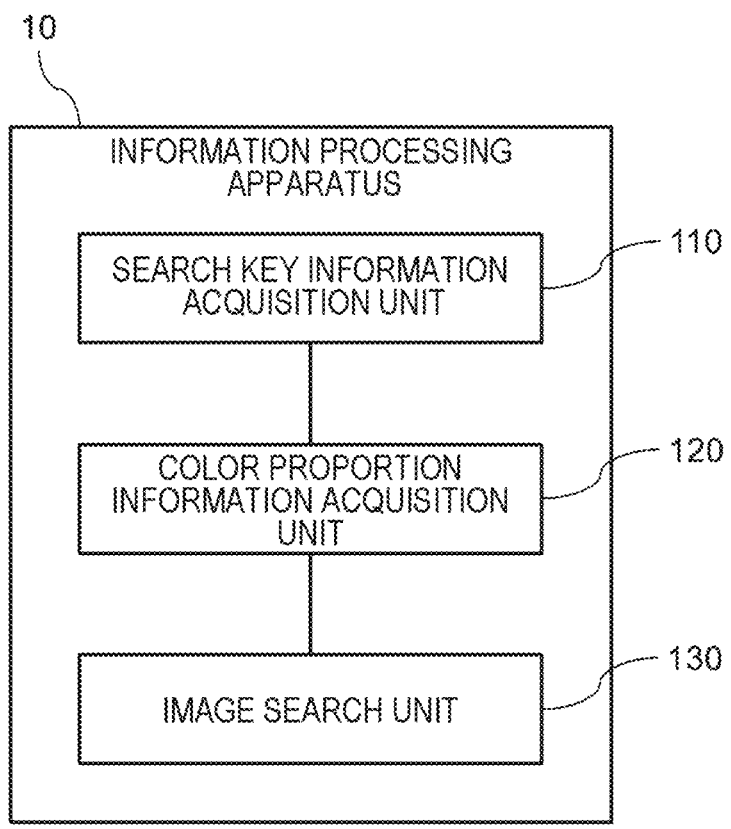
FIG. 2 is a diagram conceptually illustrating a functional configuration of an image search system according to a first example embodiment.

FIG. 2 is a diagram conceptually illustrating a functional configuration of an image search system 1 according to a first example embodiment. In the present example embodiment, one information processing apparatus 10 has functions of the image search system 1. As illustrated in FIG. 2, the information processing apparatus 10 includes a search key information acquisition unit 110, a specified color proportion information acquisition unit 120, and an image search unit 130. Note that, a functional configuration of the image search system 1 is not limited to the configuration illustrated in FIG. 2. For example, all or a part of a processing unit of the image search system 1 may be provided in a plurality of apparatuses in a distributed manner or an overlapping manner.

Hardware Configuration Example

Figure 3:
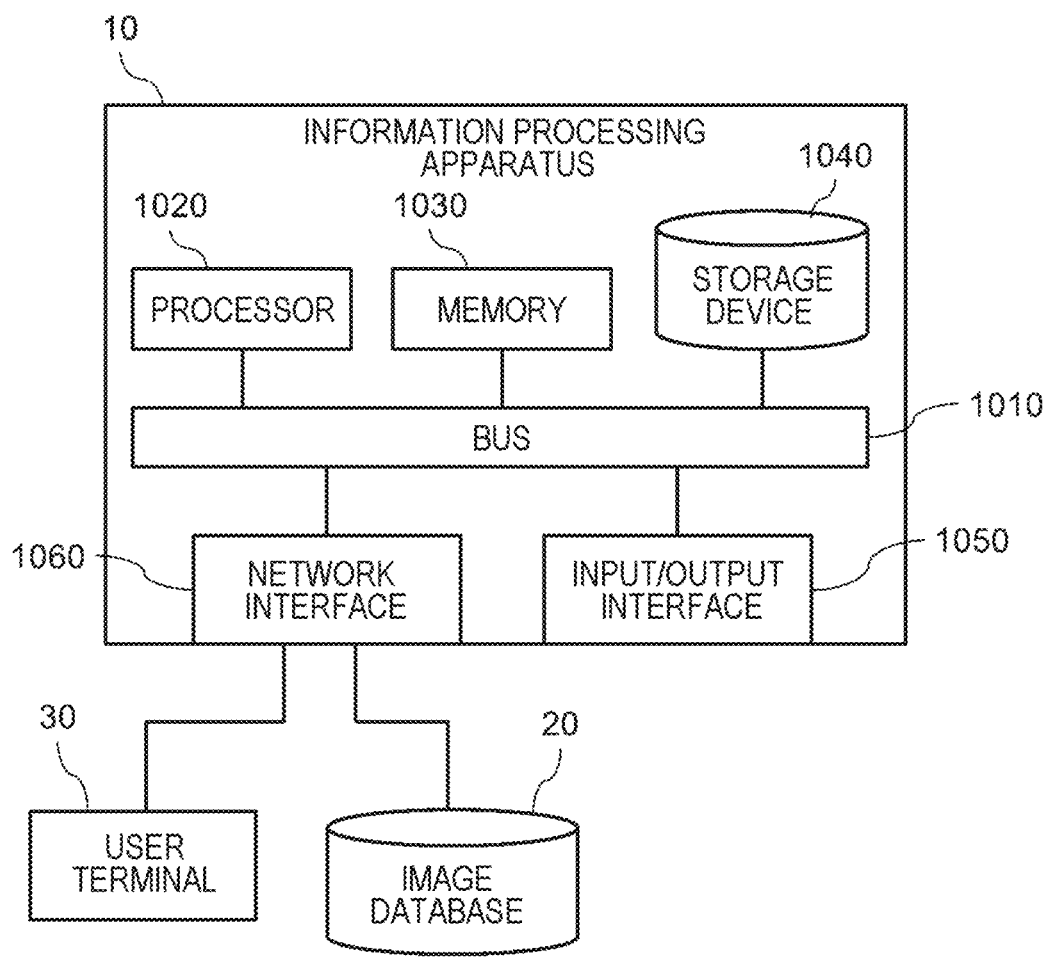
FIG. 3 is a block diagram illustrating a hardware configuration of the image search system.

Each functional configuration unit of the image search system 1 may be achieved by hardware (example: a hardwired electronic circuit, and the like) for achieving each functional configuration unit, or may be achieved by combination of hardware and software (example: combination of an electronic circuit and a program for controlling the electronic circuit, and the like). In the following, a case that one information processing apparatus 10 achieves each functional configuration unit of the image search system 1 by combination of hardware and software is further described with reference to FIG. 3. FIG. 3 is a block diagram illustrating a hardware configuration of the image search system 1.

The information processing apparatus 10 includes a bus 1010, a processor 1020, a memory 1030, a storage device 1040, an input/output interface 1050, and a network interface 1060.

The bus 1010 is a data transmission path along which the processor 1020, the memory 1030, the storage device 1040, the input/output interface 1050, and the network interface 1060 mutually transmit and receive data. However, a method of mutually connecting the processor 1020 and the like is not limited to bus connection.

The processor 1020 is a processor to be achieved by a central processing unit (CPU), a graphics processing unit (GPU), and the like.

The memory 1030 is a main storage apparatus to be achieved by a random access memory (RAM) or the like.

The storage device 1040 is an auxiliary storage apparatus to be achieved by a hard disk drive (HDD), a solid state drive (SSD), a memory card, a read only memory (ROM), and the like. The storage device 1040 stores a program module for achieving each function (the search key information acquisition unit 110, the specified color proportion information acquisition unit 120, the image search unit 130, and the like) of the image search system 1. By causing the processor 1020 to read each of these program modules in the memory 1030 and execute the program module, each function associated with each program module is achieved. The storage device 1040 may be used as a means for storing an image database 20.

The input/output interface 1050 is an interface for connecting the information processing apparatus 10 to various input/output devices. An input apparatus (not illustrated) such as a keyboard and a mouse, an output apparatus (not illustrated) such as a display and a speaker, and the like may be connected to the input/output interface 1050.

The network interface 1060 is an interface for connecting the information processing apparatus 10 to a network. The network is, for example, a local area network (LAN) or a wide area network (WAN). A method of connecting to a network by the network interface 1060 may be wireless connection or may be wired connection. In the example of FIG. 3, the information processing apparatus 10 is connected to a user terminal 30 via the network interface 1060. When the image database 20 is provided in an unillustrated external apparatus, the information processing apparatus 10 can access to the image database 20 of the unillustrated external apparatus via the network interface 1060.

Note that, a hardware configuration of the image search system 1 is not limited to the configuration illustrated in FIG. 3.

<Flow of Processing>

Figure 4:
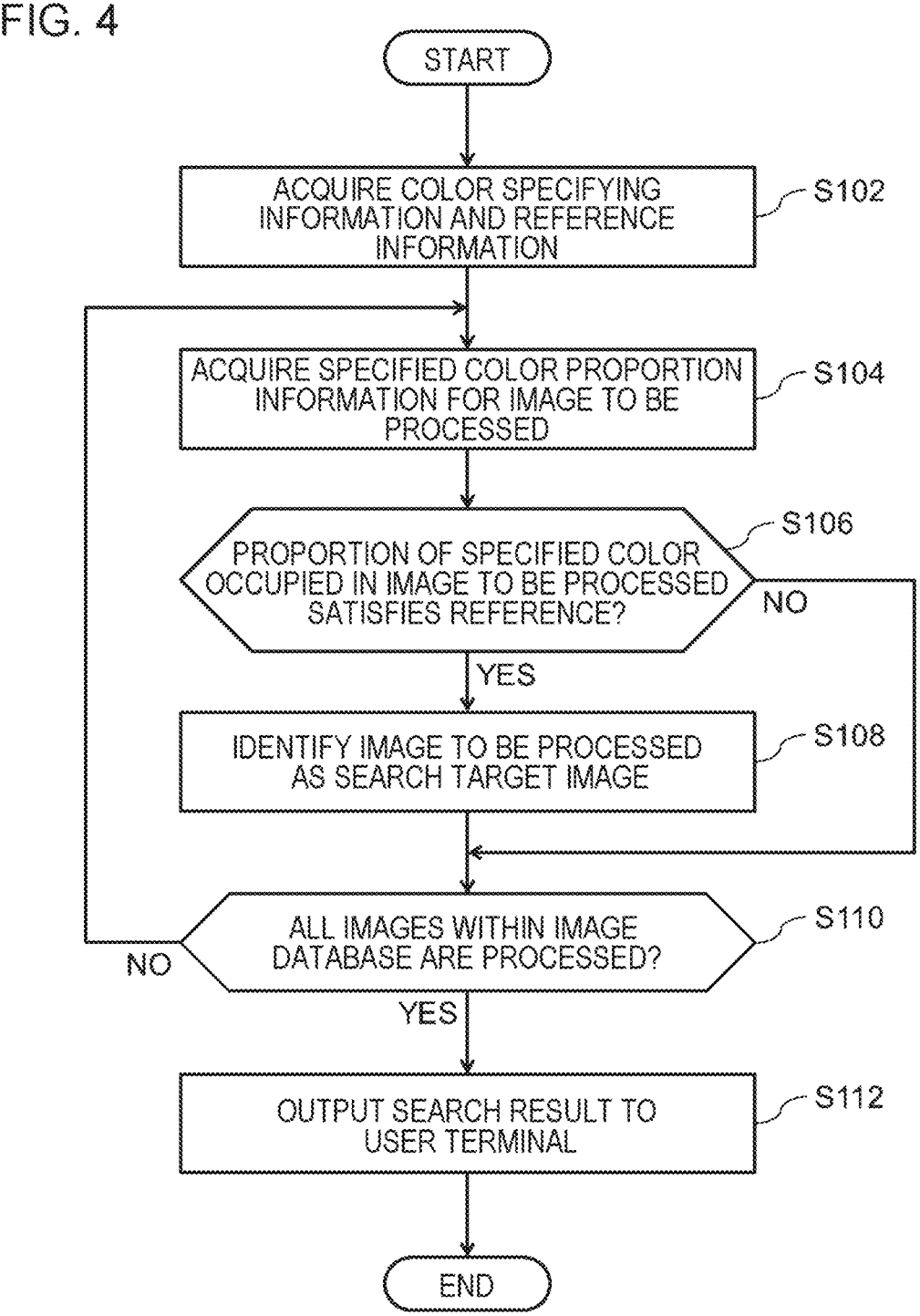
FIG. 4 is a flowchart illustrating a flow of processing to be performed by the image search system according to the first example embodiment.

In the following, a flow of processing to be performed by the image search system 1 according to the present example embodiment is described with reference to the drawings. FIG. 4 is a flowchart illustrating the flow of the processing to be performed by the image search system 1 according to the first example embodiment.

The search key information acquisition unit 110 acquires color specifying information and reference information (S102). For example, the search key information acquisition unit 110 causes the user terminal 30 to display a user interface (e.g., a color specifying screen having a color pallet, a color plane, and the like) for specifying a color, and allows a user to select one or more colors on the user interface. The search key information acquisition unit 110 can acquire the color specifying information, based on user's selection input on the user interface displayed on the user terminal 30. The search key information acquisition unit 110 can also acquire the reference information relating to a specified color, based on user's input on the above-described color specifying screen or an input screen separately displayed on the user terminal 30. Herein, when a plurality of colors are specified as an image search condition, one reference is set with respect to the plurality of colors.

The specified color proportion information acquisition unit 120 selects one image to be processed stored in the image database 20, and acquires specified color proportion information of the image, based on the color specifying information acquired in the processing of S102 (S104). For example, the specified color proportion information acquisition unit 120 acquires the specified color proportion information of an image to be processed by using the color specifying information and color histogram information of the image to be processed. The color histogram information is information indicating a frequency distribution of a color included in an image to be processed.

Figure 5:
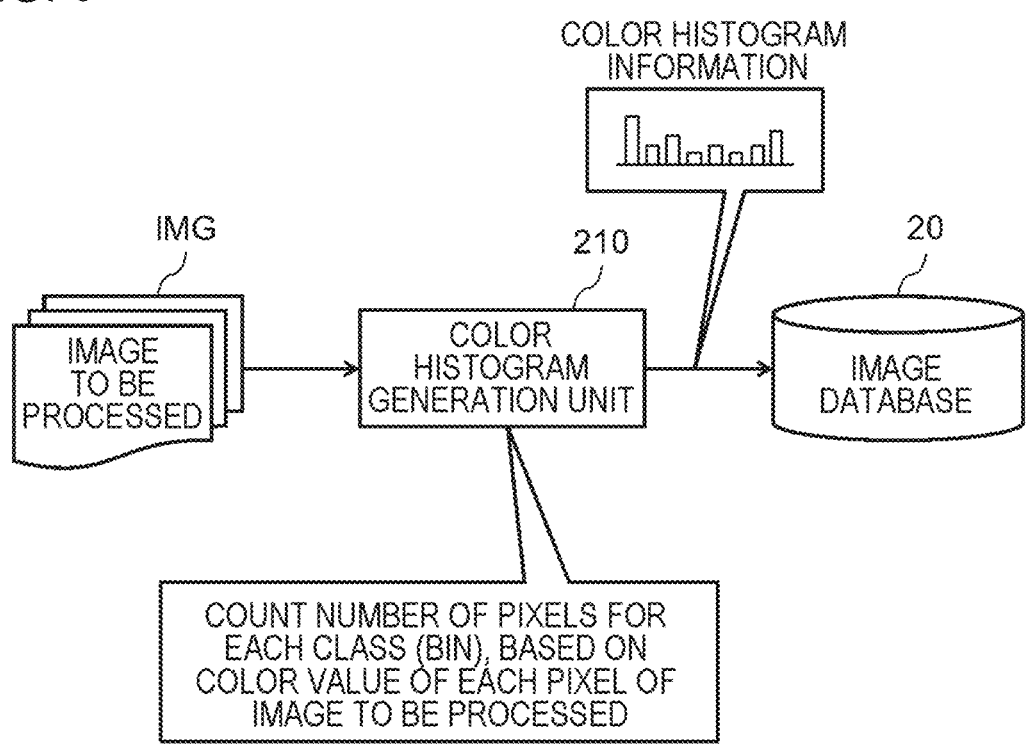
FIG. 5 is a diagram schematically illustrating a flow of generating color histogram information by a color histogram generation unit.

Herein, each piece of color histogram information of each image to be processed is generated by a color histogram generation unit 210, and stored in the image database 20, for example, as illustrated in FIG. 5. FIG. 5 is a diagram schematically illustrating a flow of generating the color histogram information by the color histogram generation unit 210. The color histogram generation unit 210 is a processing unit that analyzes an image to be processed IMG, and generates the color histogram information. The color histogram generation unit 210 may be provided in the image search system 1, or may be provided in another system (not illustrated) different from the image search system 1. The color histogram generation unit 210 can generate the color histogram information as follows, for example. First, the color histogram generation unit 210 acquires a color value of a pixel for an image to be processed. Then, the color histogram generation unit 210 counts the number of pixels belonging to each class (bin) for which a color value range is set in advance, based on a color value of each pixel. Thus, the color histogram information indicating a frequency distribution of a color included in the image to be processed is generated. Then, the color histogram generation unit 210 stores, in the image database 20, the generated color histogram information in association with identification information of an image (image to be processed) associated with the color histogram information. The image database 20 is, for example, stored in the storage device 1040 of the information processing apparatus 10.

Referring back to FIG. 4, the image search unit 130 determines whether a proportion of a specified color occupied in the image to be processed satisfies a reference of reference information, based on the specified color proportion information acquired in the processing of S104, and the reference information acquired in S102 (S106). When the proportion of the specified color occupied in the image to be processed satisfies the reference (YES in S106), the image search unit 130 identifies the image to be processed as a search target image (S108). In this case, the image search unit 130 stores, in a storage area such as the memory 1030, an identifier (ID) and the like of an image identified as the search target image. On the other hand, when the proportion of the specified color occupied in the image to be processed does not satisfy the reference (NO in S106), the image search unit 130 does not perform the processing of S108. The processing from S104 is repeatedly performed until all images within the image database are processed (NO in S110).

When all images within the image database are processed (YES in S110), the image search unit 130 outputs a search result of the images to the user terminal 30 (S112). The image search unit 130 determines an image identified as a search target image by using the ID of the image, which is stored in the storage area such as the memory 1030, and outputs, to the user terminal 30, data of the image stored in the image database 20. Thus, a user can check, on a display of the user terminal 30, the image identified as the search target image.

Specific Example

In the following, a flow of processing according to the present example embodiment is described in more detail with reference to the drawings.

Figure 6:
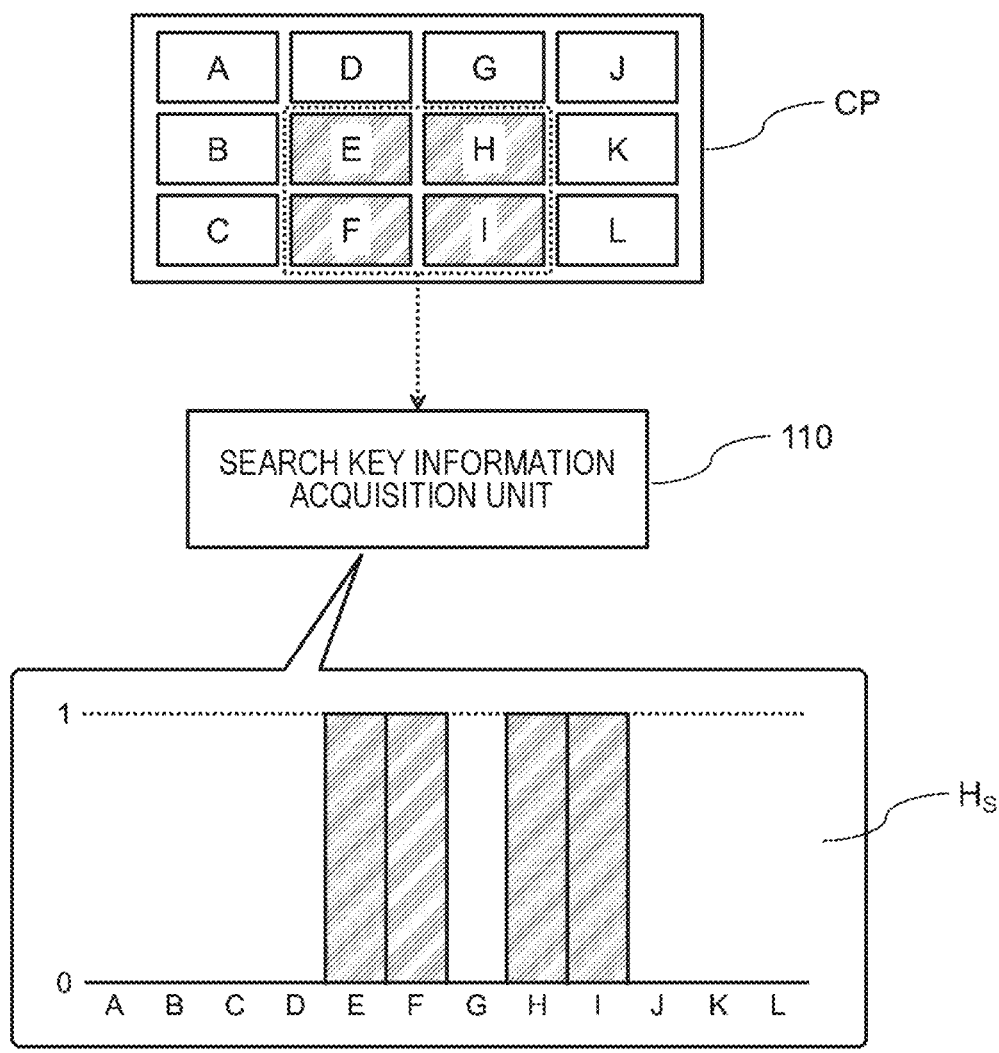
FIG. 6 is a diagram illustrating a specific example of a flow of generating color specifying information by a search key information acquisition unit.

FIG. 6 is a diagram illustrating a specific example of a flow of generating color specifying information by the search key information acquisition unit 110. In the example of FIG. 6, the search key information acquisition unit 110 causes the user terminal 30 to display a color pallet CP having a plurality of colors (A to L). In the example of FIG. 6, a user selects four colors (E, F, H, and I) on the color pallet CP. The search key information acquisition unit 110 acquires information indicating a selection state of the color pallet CP, and generates an image search histogram $H_S$, as illustrated in the drawing. In the image search histogram $H_S$ illustrated in FIG. 6, a size of a class (bin) associated with the four colors (E, F, H, and I) selected on the color pallet CP is set to 1, and the size of a class (bin) associated with the other colors (A to D, G, and J to L) that are not selected is set to 0. Note that, although not illustrated, the search key information acquisition unit 110 further accepts input of information indicating a proportion (reference) of the four colors selected on the color pallet CP, which is occupied in an image, for identifying a search target image, and acquires reference information, based on the input.

Figure 7:
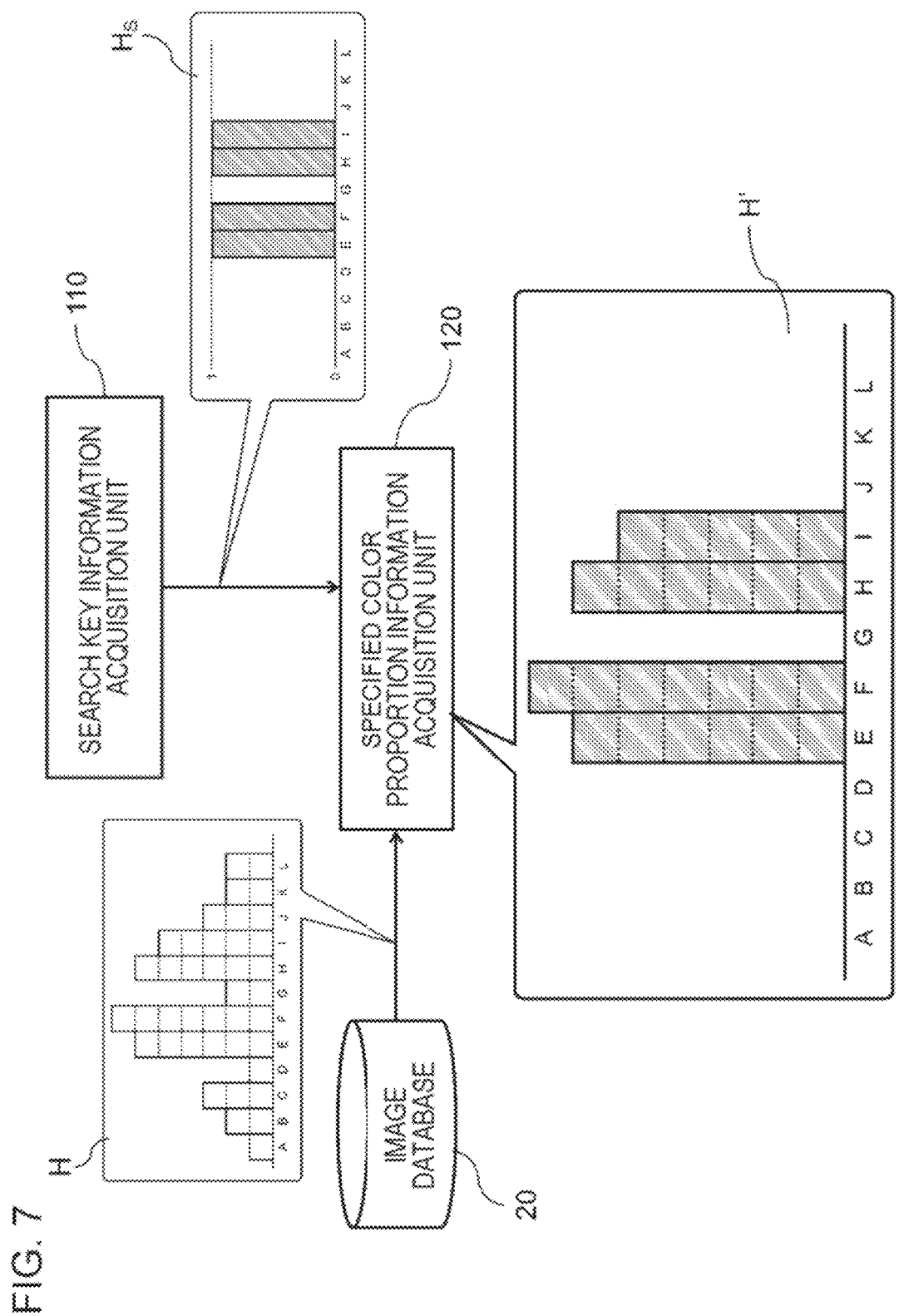
FIG. 7 is a diagram illustrating a specific example of a flow of generating specified color proportion information by a specified color proportion information acquisition unit.

FIG. 7 is a diagram illustrating a specific example of a flow of generating specified color proportion information by the specified color proportion information acquisition unit 120. The specified color proportion information acquisition unit 120 reads, from the image database 20, color histogram information H of an image to be processed. The specified color proportion information acquisition unit 120 acquires, from the search key information acquisition unit 110, an image search histogram $H_S$. Then, the specified color proportion information acquisition unit 120 computes an inner product of the image search histogram $H_S$ and a histogram indicated by the color histogram information H of the image to be processed. By deriving the inner product with respect to the image search histogram $H_S$, only a portion associated with a specified color is extracted from the color histogram information H (symbol H' in the drawing). Then, the specified color proportion information acquisition unit 120 can acquire the specified color proportion information, based on the entirety of the color histogram H and the computation result H' of the inner product. In the example of FIG. 7, since the color histogram H indicates forty squares, and the computation result H' of the inner product indicates twenty-four squares, the specified color proportion information acquisition unit 120 can acquire specified color proportion information indicating that the proportion of the specified color is "60%".

Then, the image search unit 130 identifies whether the image to be processed is a search target image, based on the specified color proportion information acquired by the specified color proportion information acquisition unit 120 and the reference information acquired by the search key information acquisition unit 110. Herein, it is assumed that the search key information acquisition unit 110 acquires reference information indicating a reference such as "50% or more", "70% or less", or "50% to 70%". In this case, the image search unit 130 can determine that "the image to be processed is a search target image", based on the specified color proportion information indicating that a proportion of a specified color is "60%", which is acquired by the specified color proportion information acquisition unit 120 and a reference of the reference information. On the other hand, when the search key information acquisition unit 110 acquires reference information indicating a reference such as "65% or more", "50% or less", or "30 to 50%", the image search unit 130 can determine that "the image to be processed is not a search target image". Similarly, the image search unit 130 repeats determination for each of images to be processed stored in the image database 20, and outputs, to the user terminal 30, data of an image identified as "a search target image". A user can find a target image from among images (images whose ranges are narrowed down by a specified condition) displayed on the user terminal 30.

<Specific Use>

The image search system 1 according to the present example embodiment can be used for a case of finding a target person, vehicle, and the like from video data of a surveillance camera, and the like, for example. In this case, a person who performs monitoring work can easily find an image of a target person or vehicle by inputting witness information (information relating to a color and a proportion thereof of clothes or belongings of a person, or a color and a proportion thereof of a target vehicle). In a case of acquiring specified color information, the search key information acquisition unit 110 may utilize an image of a target person or a target vehicle photographed by a witness. For example, the search key information acquisition unit 110 can acquire specified color information indicating, as a specified color, a color of a person or a vehicle captured in an image photographed by a witness. The search key information acquisition unit 110 may generate a color pallet or a color space, based on a color of a person or a vehicle captured in an image photographed by a witness, and cause the user terminal 30 to display a screen including the color pallet or the color space.

The image search system 1 according to the present example embodiment can be used for a case of finding a target product in a shopping site and the like, and the like. In this case, a user of the shopping site can easily find a target product by inputting a color and a proportion thereof of the target product.

Second Example Embodiment

The present example embodiment is different from the first example embodiment in the following point.

Functional Configuration Example

Figure 8:
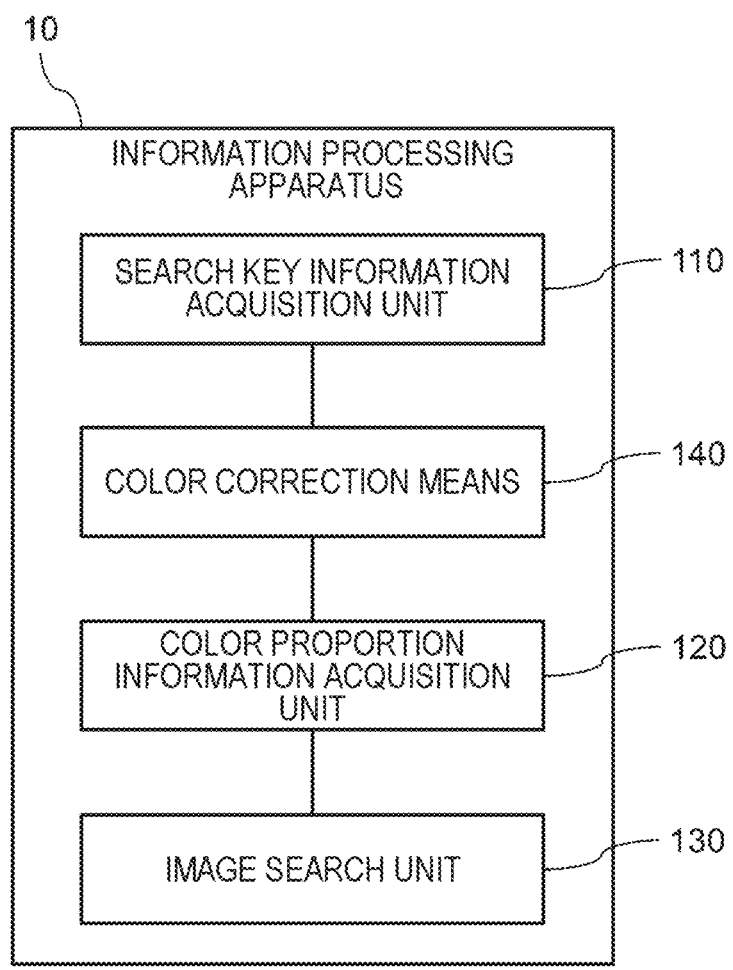
FIG. 8 is a diagram conceptually illustrating a functional configuration of an image search system according to a second example embodiment.

FIG. 8 is a diagram conceptually illustrating a functional configuration of an image search system 1 according to a second example embodiment. As illustrated in FIG. 8, the image search system 1 according to the present example embodiment includes a color correction unit 140, in addition to the configuration according to the first example embodiment. The color correction unit 140 corrects a plurality of colors associated with color specifying information by using preset information. The preset information is information for converting a plurality of colors associated with the color specifying information according to an environment in which an image to be processed is generated. For example, the preset information defines a color appearance change (correction value) in various environments, such as outdoor/indoor, a type of light (such as natural light and fluorescent light), a time zone (morning/evening/nighttime). The color correction unit 140 changes a color (color value) to be specified by the color specifying information by using a correction value indicated by the preset information, for example.

<Flow of Processing>

Figure 9:
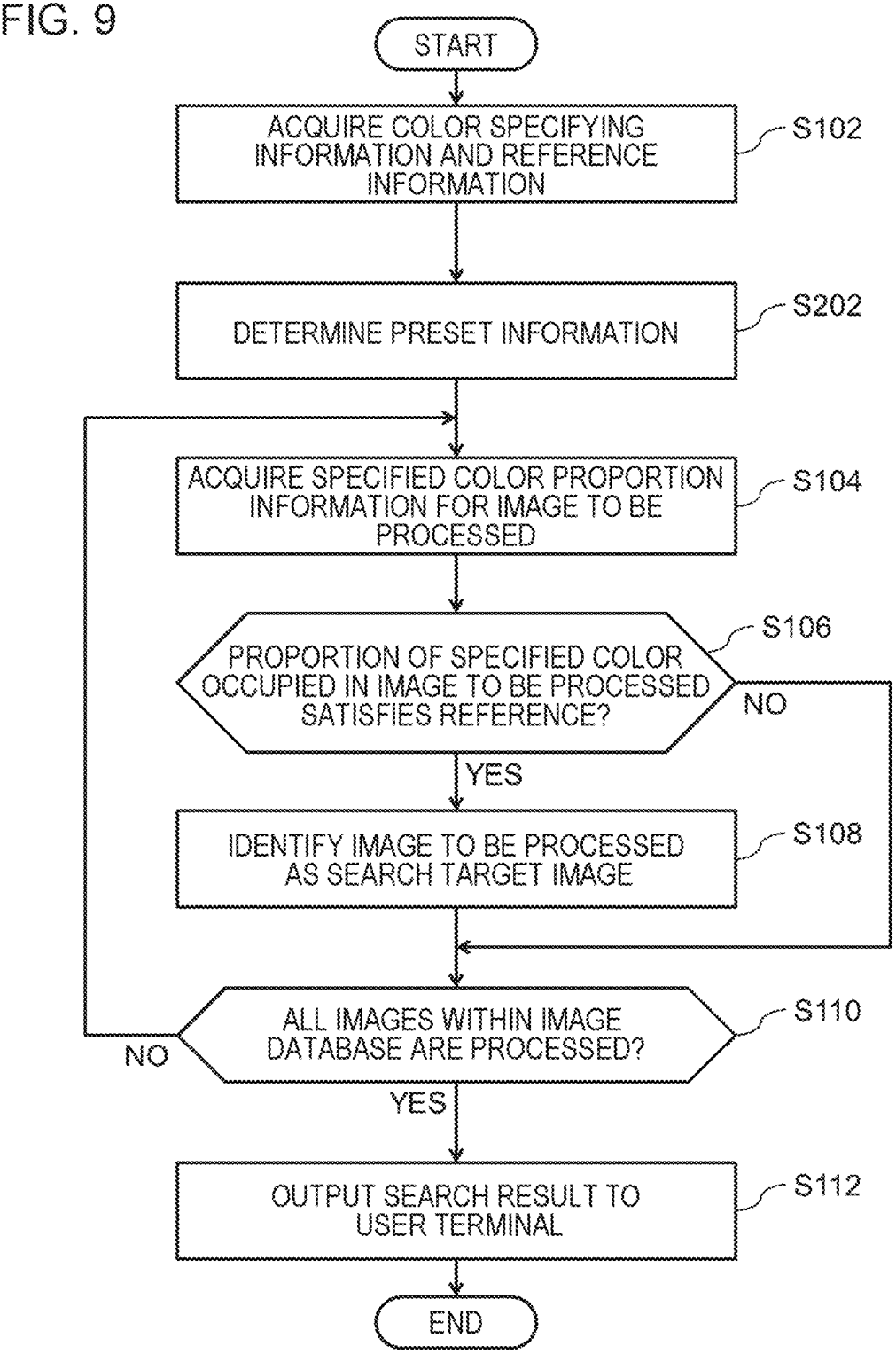
FIG. 9 is a flowchart illustrating a flow of processing to be performed by the image search system according to the second example embodiment.

In the following, a flow of processing to be performed by the image search system 1 according to the present example embodiment is described with reference to the drawings. FIG. 9 is a flowchart illustrating the flow of the processing to be performed by the image search system 1 according to the second example embodiment. The flowchart of FIG. 9 is different from the flowchart of FIG. 4 in a point that the flowchart includes processing of S202. In the following, the processing of S202 is mainly described.

Figure 10:
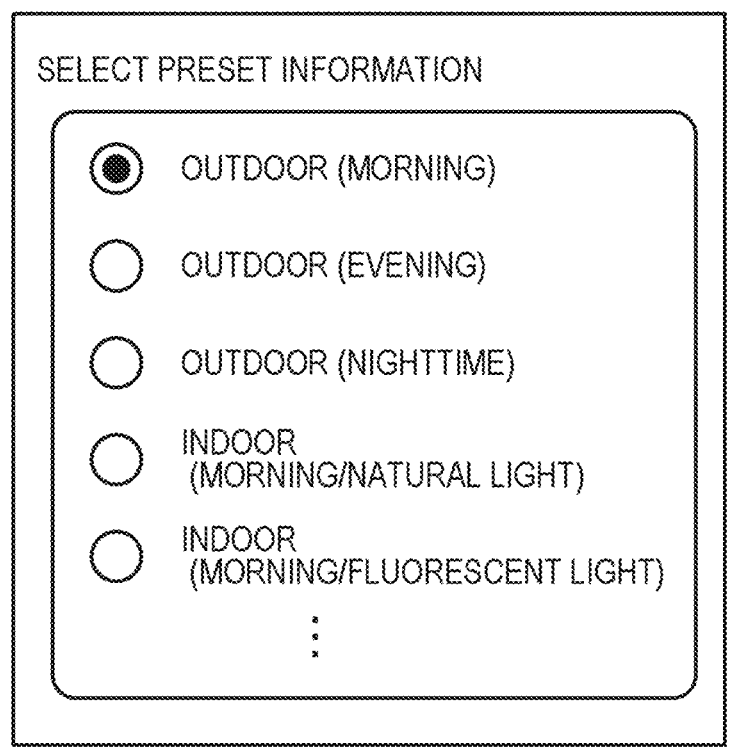
FIG. 10 is a diagram illustrating one example of a screen on which preset information to be applied at the time of image search is selected.

The color correction unit 140 determines preset information to be applied to a color of color specifying information acquired in the processing of S102 (S202). As one example, the color correction unit 140 can accept selection input of the preset information to be applied at the time of image search by causing a user terminal 30 to display a screen as illustrated in FIG. 10. FIG. 10 is a diagram illustrating one example of a screen on which the preset information to be applied at the time of image search is selected. A user can change the preset information to be applied by switching a selection state of a radio button on the screen illustrated in FIG. 10. Note that, an option indicating that the preset information is not used may be available on the screen illustrated in FIG. 10. As another example, the color correction unit 140 may be configured in such a way as to automatically change the preset information according to a condition of generating an image to be processed. For example, the color correction unit 140 determines a time, a position, and the like when and where an image to be processed is generated, based on metadata appended to the image to be processed, and selects optimum preset information. Specifically, the color correction unit 140 can select the preset information "outdoor (nighttime)", as the preset information to be applied, when it is determined that an image to be processed has been generated outdoors at nighttime from position information and time information of metadata appended to the image to be processed.

<Operation and Advantageous Effect>

As described above, in the present example embodiment, a color specified as a search condition is changed depending on an environment in which an image to be processed is generated. Thus, an advantageous effect of improving accuracy of searching a target image is expected. In the present example embodiment, preset information for color correction is applied to a color specified as a search condition, instead of an image to be processed. Specifically, in the present example embodiment, since it is not necessary to correct a color of each image to be processed one by one, an advantageous effect of reducing a computation amount at the time of color correction is expected.

Third Example Embodiment

The present example embodiment is different from the above-described example embodiments in the following point.

Functional Configuration Example

An image search system 1 according to the present example embodiment has a functional configuration (example: FIG. 2) similar to the first example embodiment.

Figure 11:
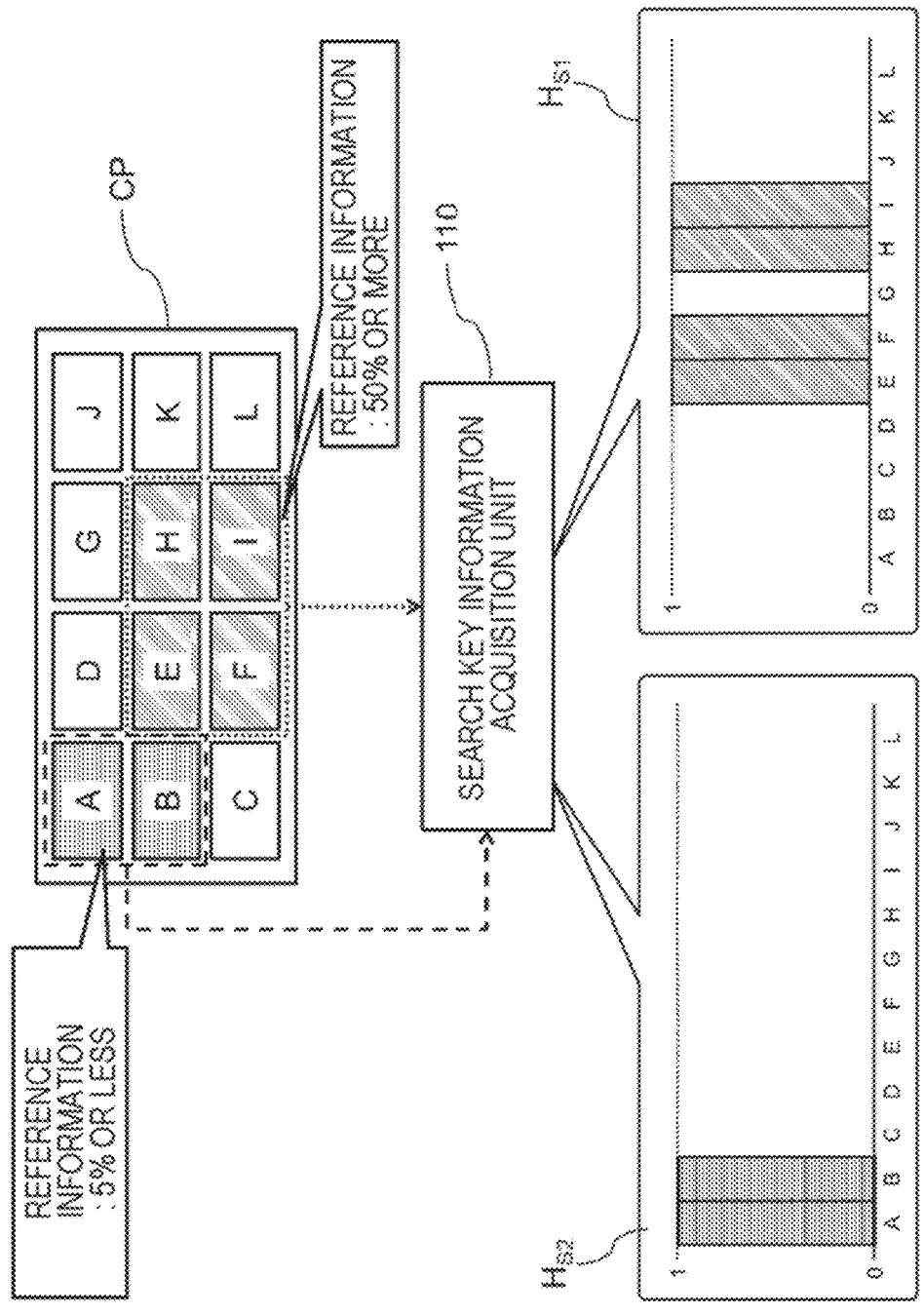
FIG. 11 is a diagram illustrating one example of an operation of a search key information acquisition unit according to a third example embodiment.

A search key information acquisition unit 110 according to the present example embodiment acquires a plurality of sets of color specifying information and reference information. One example of an operation of the search key information acquisition unit 110 according to the present example embodiment is described with reference to FIG. 11. FIG. 11 is a diagram illustrating one example of the operation of the search key information acquisition unit 110 according to a third example embodiment. In the example of FIG. 11, the search key information acquisition unit 110 causes a user terminal 30 to display a color pallet CP having a plurality of colors (A to L). In the example of FIG. 11, a user selects, on the color pallet CP, four colors (E, F, H, and I), and two colors (A and B). In the example of FIG. 11, a user sets, as reference information, information "50% or more" for the specified four colors (E, F, H, and I). In the example of FIG. 11, a user sets, as the reference information, information "5% or less" for the two colors (A and B). In this case, the search key information acquisition unit 110 acquires, as first color specifying information and first reference information (first set), a first image search histogram $H_{S1}$ generated based on the specified four colors (E, F, H, and I), and information that "(a proportion of a specified color is) 50% or more". The search key information acquisition unit 110 acquires, as second color specifying information and second reference information (second set), a second image search histogram $H_{S2}$ generated based on the specified two colors (A and B), and information that "(a proportion of a specified color is) 5% or less".

Figure 12:
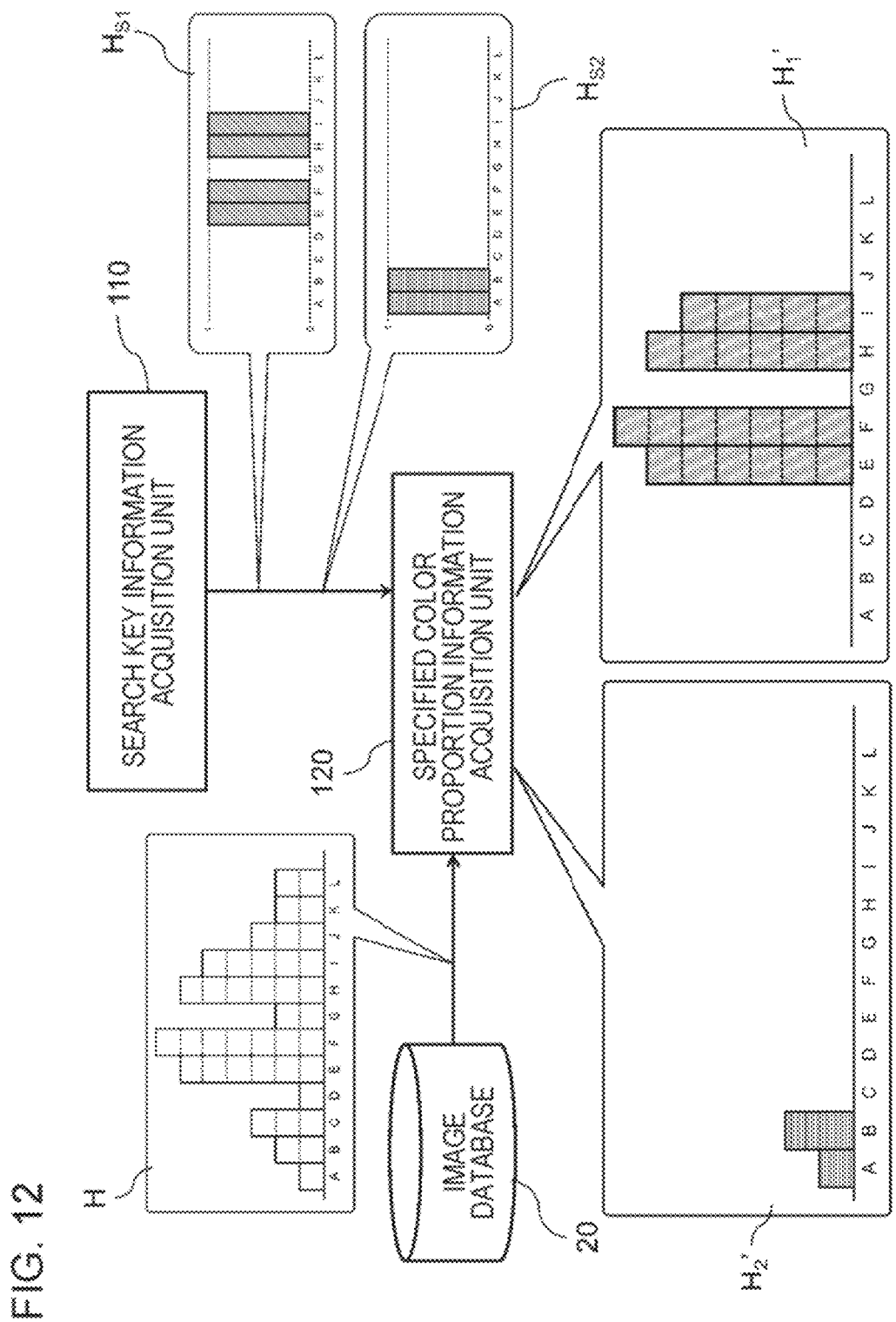
FIG. 12 is a diagram illustrating one example of an operation of a specified color proportion information acquisition unit according to the third example embodiment.

A specified color proportion information acquisition unit 120 according to the present example embodiment acquires specified color proportion information for each set by using the color specifying information of each of a plurality of sets acquired by the search key information acquisition unit 110. One example of an operation of the specified color proportion information acquisition unit 120 according to the present example embodiment is described with reference to FIG. 12. FIG. 12 is a diagram illustrating one example of the operation of the specified color proportion information acquisition unit 120 according to the third example embodiment. First, the specified color proportion information acquisition unit 120 reads, from an image database 20, color histogram information H of an image to be processed. The specified color proportion information acquisition unit 120 acquires, from the search key information acquisition unit 110, the first image search histogram $H_{S1}$ and the second image search histogram $H_{S2}$. Then, the specified color proportion information acquisition unit 120 computes an inner product with respect to a histogram indicated by the color histogram information H of the image to be processed by individually using each of the first image search histogram $H_{S1}$ and the second image search histogram $H_{S2}$. In the case of the example of FIG. 12, the specified color proportion information acquisition unit 120 can acquire a computation result indicated by symbols $H_1'$ and $H_2'$ in the drawing. The symbol $H_1'$ in the drawing indicates a computation result of an inner product of the first image search histogram $H_{S1}$ and a histogram of the color histogram information H. The symbol $H_2'$ in the drawing indicates a computation result of an inner product of the second image search histogram $H_{S2}$ and a histogram of the color histogram information H. The specified color proportion information acquisition unit 120 can acquire the specified color proportion information for each set by using these computation results. For example, the specified color proportion information acquisition unit 120 can acquire the first specified color proportion information indicating that a proportion of a specified color is "60%" by using the computation result $H_1'$ of an inner product of the first image search histogram $H_{S1}$ and a histogram of the color histogram information H. The specified color proportion information acquisition unit 120 can acquire the second specified color proportion information indicating that a proportion of a specified color is "7.5%" by using the computation result $H_2'$ of an inner product of the second image search histogram $H_{S2}$ and a histogram of the color histogram information H.

An image search unit 130 according to the present example embodiment identifies a search target image by using the specified color proportion information for each set, and reference information for each set. For example, the image search unit 130 identifies whether the image to be processed is a search target image by combining a comparison result between the specified color proportion information and the reference information for each set, with a logical operator such as a logical sum, a logical AND, and a logical NOT. A user can select, on a screen displayed on the user terminal 30, which one of the logical operators is used.

In the example illustrated in FIGS. 11 and 12, first, the specified color proportion information acquisition unit 120 compares the first specified color proportion information (information indicating that a proportion of a specified color is "60%"), which is acquired by using the first color specifying information, with the first reference information (information indicating that a proportion of a specified color is "50% or more"), which is input with respect to the first color specifying information. In this case, the specified color proportion information acquisition unit 120 can determine that the image to be processed "satisfies a reference relating to the first set". The specified color proportion information acquisition unit 120 compares the second specified color proportion information (information indicating that a proportion of a specified color is "7.5%"), which is acquired by using the second color specifying information, with the second reference information (information indicating that a proportion of a specified color is "5% or less"), which is input with respect to the second color specifying information. In this case, the specified color proportion information acquisition unit 120 can determine that the image to be processed "does not satisfy a reference relating to the second set". Herein, when it is selected to determine whether the image to be processed is a search target image by a logical sum of a comparison result of each set, the image search unit 130 identifies that the image to be processed is a search target image. When it is selected to determine whether the image to be processed is a search target image by a logical AND of a comparison result of each set, the image search unit 130 identifies that the image to be processed is not a search target image.

<Operation and Advantageous Effect>

As described above, in the present example embodiment, it is determined "whether a proportion of a specified color occupied in an image to be processed satisfies a reference of reference information" for each set, and a search target image is identified by combining a determination result for each set with a logical computation. Thus, a user can perform more enhanced image search. For example, it becomes possible to perform image search by respectively and individually specifying a condition of a color of clothes worn by a certain person and a condition of a color of an article (e.g., a bag, or the like) carried by the same person.

Fourth Example Embodiment

The present example embodiment is different from the above-described example embodiments in the following point.

Functional Configuration Example

An image search system 1 according to the present example embodiment has a functional configuration (example: FIG. 2) similar to the first example embodiment.

Figure 13:
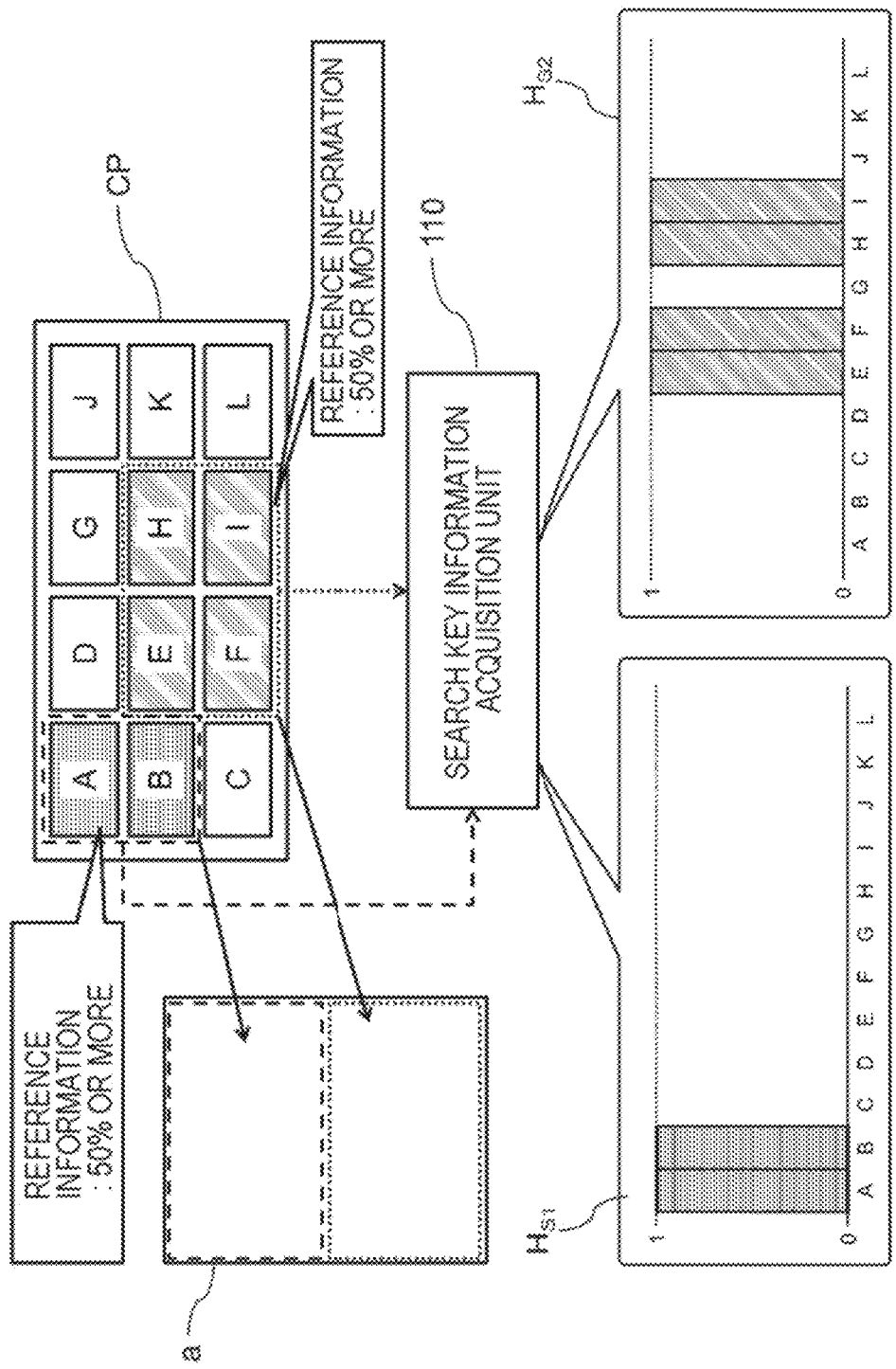
FIG. 13 is a diagram illustrating one example of an operation of a search key information acquisition unit according to a fourth example embodiment.

A search key information acquisition unit 110 according to the present example embodiment acquires color specifying information and reference information for each predefined partial area of an image. One example of an operation of the search key information acquisition unit 110 according to the present example embodiment is described with reference to FIG. 13. FIG. 13 is a diagram illustrating one example of the operation of the search key information acquisition unit 110 according to a fourth example embodiment. In the example of FIG. 13, the search key information acquisition unit 110 causes a user terminal 30 to display a color pallet CP having a plurality of colors (A to L). In the example of FIG. 13, partial areas (areas indicated by a broken line and a dotted line) are defined in such a way that an area a of an image to be processed is divided into upper and lower half portions. Then, a user inputs color specifying information and reference information to each of these partial areas. In the example of FIG. 13, a user selects, on the color pallet CP, two colors (A and B) and four colors (E, F, H, and I), as specified colors of the upper partial area and the lower partial area, respectively. A user sets, as reference information, information "50% or more" for the specified colors (A and B) of the upper partial area. A user sets, as reference information, information "50% or more" for the specified colors (E, F, H, and I) of the lower partial area. In this case, the search key information acquisition unit 110 acquires, as first color specifying information and first reference information, a first image search histogram $H_{S1}$ generated based on the two colors (A and B) specified for the upper partial area, and information that "(a proportion of a specified color is) 50% or more". The search key information acquisition unit 110 acquires, as second color specifying information and second reference information, a second image search histogram $H_{S2}$ generated based on the four colors (E, F, H, and I) specified for the lower partial area, and information that "(a proportion of a specified color is) 50% or more".

Figure 14:
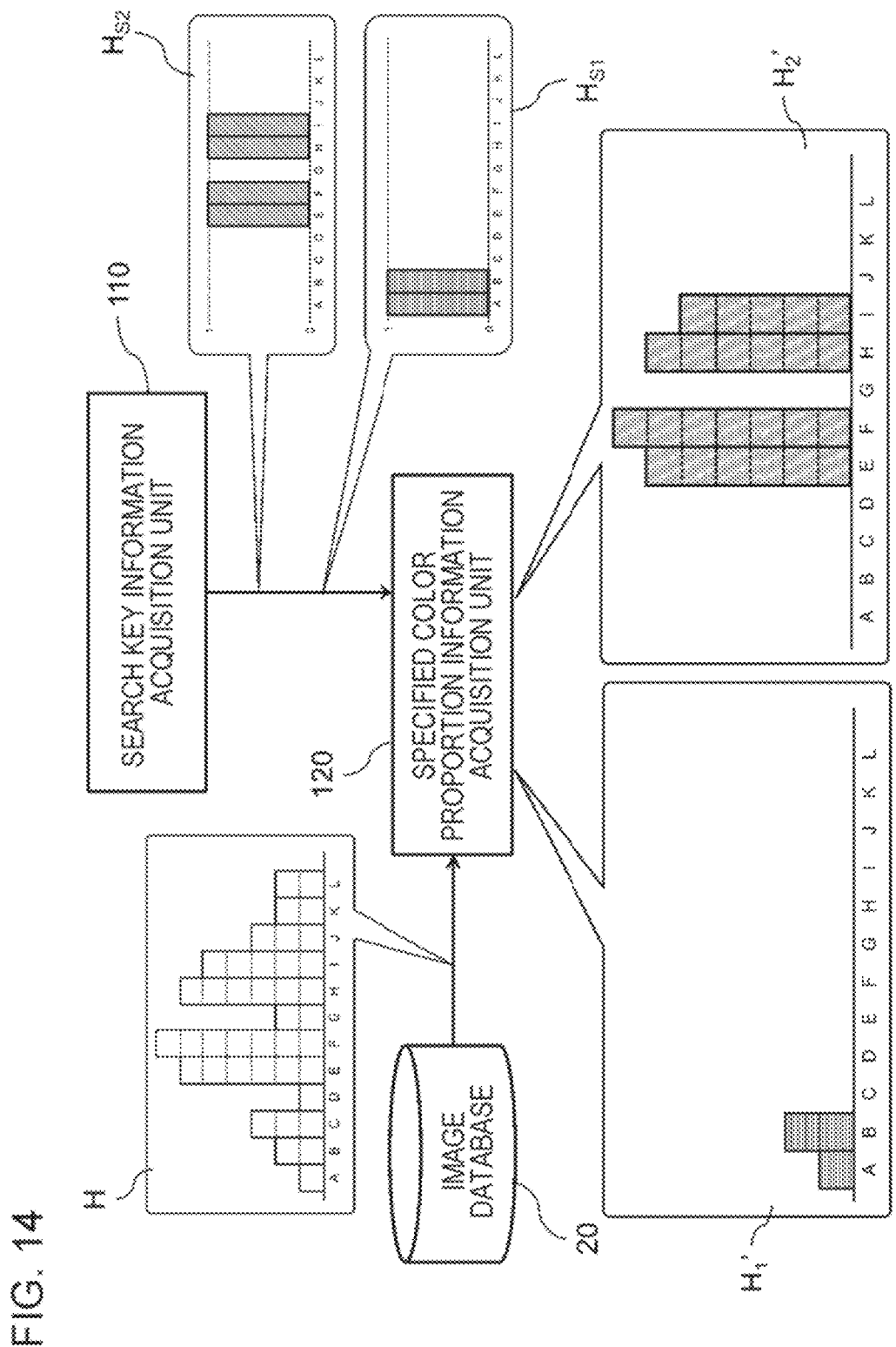
FIG. 14 is a diagram illustrating one example of an operation of a specified color proportion information acquisition unit according to the fourth example embodiment.

A specified color proportion information acquisition unit 120 according to the present example embodiment acquires specified color proportion information for each partial area of an image to be processed by using the color specifying information of each partial area acquired by the search key information acquisition unit 110. One example of an operation of the specified color proportion information acquisition unit 120 according to the present example embodiment is described with reference to FIG. 14. FIG. 14 is a diagram illustrating one example of the operation of the specified color proportion information acquisition unit 120 according to the fourth example embodiment. First, the specified color proportion information acquisition unit 120 reads, from an image database 20, color histogram information H of an image to be processed. The specified color proportion information acquisition unit 120 acquires, from the search key information acquisition unit 110, the first image search histogram $H_{S1}$ and the second image search histogram $H_{S2}$. Then, the specified color proportion information acquisition unit 120 computes an inner product with respect to a histogram indicated by the color histogram information H of the image to be processed by and individually using each of the first image search histogram $H_{S1}$ and the second image search histogram $H_{S2}$. In the case of the example of FIG. 14, the specified color proportion information acquisition unit 120 can acquire a computation result indicated by symbols $H_1'$ and $H_2'$ in the drawing. The symbol $H_1'$ in the drawing indicates a computation result of an inner product of the first image search histogram $H_{S1}$ and a histogram of the color histogram information H. The symbol $H_2'$ in the drawing indicates a computation result of an inner product of the second image search histogram $H_{S2}$ and a histogram of the color histogram information H. The specified color proportion information acquisition unit 120 can acquire the specified color proportion information for each partial area by using these computation results. For example, the specified color proportion information acquisition unit 120 can acquire the first specified color proportion information indicating that a proportion of a specified color is "7.5%" by using the computation result $H_1'$ of an inner product of the first image search histogram $H_{S1}$ and a histogram of the color histogram information H. The specified color proportion information acquisition unit 120 can acquire the second specified color proportion information indicating that a proportion of a specified color is "60%" by using the computation result $H_2'$ of an inner product of the second image search histogram $H_{S2}$ and a histogram of the color histogram information H.

An image search unit 130 according to the present example embodiment identifies a search target image by using the specified color proportion information for each partial area, and reference information for each partial area. For example, the image search unit 130 identifies whether the image to be processed is a search target image by combining a comparison result between the specified color proportion information and the reference information for each partial area, with a logical operator such as a logical sum, a logical AND, and a logical NOT. A user can select, on a screen displayed on the user terminal 30, which one of the logical operators is used.

In the example illustrated in FIGS. 13 and 14, first, the specified color proportion information acquisition unit 120 compares the first specified color proportion information (information indicating that a proportion of a specified color is "7.5%"), which is acquired by using the first color specifying information, with the first reference information (information indicating that a proportion of a specified color is "50% or more"), which is input with respect to the first color specifying information. In this case, the specified color proportion information acquisition unit 120 can determine that the image to be processed "does not satisfy a reference relating to a first partial area". The specified color proportion information acquisition unit 120 compares the second specified color proportion information (information indicating that a proportion of a specified color is "60%"), which is acquired by using the second color specifying information, with the second reference information (information indicating that a proportion of a specified color is "50% or more"), which is input with respect to the first second color specifying information. In this case, the specified color proportion information acquisition unit 120 can determine that the image to be processed "satisfies a reference relating to a second partial area". Herein, when it is selected to determine whether the image to be processed is a search target image by a logical sum of a comparison result of each partial area, the image search unit 130 identifies that the image to be processed is a search target image. When it is selected to determine whether the image to be processed is a search target image by a logical AND of a comparison result of each partial area, the image search unit 130 identifies that the image to be processed is not a search target image.

<Operation and Advantageous Effect>

As described above, in the present example embodiment, it is determined "whether an occupied proportion of a specified color satisfies a reference of reference information" for each partial area of an image to be processed, and a search target image is identified by combining a determination result for each partial area with a logical computation. Thus, a user can perform more enhanced image search. For example, it becomes possible to perform image search by respectively and individually specifying a condition of a color of clothes for the upper body of a search target person, and a condition of a color of clothes for the lower body thereof.

While the example embodiments of the present invention have been described with reference to the drawings, the example embodiments are only exemplification of the present invention, and various configurations other than the above-described example embodiments can also be employed.

Further, the plurality of steps (processing) are described in order in the flowcharts used in the above-described description, but an execution order of the steps to be executed in the example embodiments is not limited to the described order. In the example embodiments, the order of the illustrated steps can be changed within an extent that there is no harm in context. Further, the above-described example embodiments can be combined within an extent that there is no contradiction in context.

A part or all of the above-described example embodiments may also be described as the following supplementary notes, but is not limited to the following.

1.
An image search system, including:
a search key information acquisition unit that acquires color specifying information indicating a plurality of colors and reference information indicating a reference of proportions of the plurality of colors being occupied in an image area;
a specified color proportion information acquisition unit that acquires specified color proportion information indicating proportions of the plurality of colors associated with the color specifying information, being occupied in an image to be processed; and
an image search unit that identifies whether the image to be processed is a search target image, based on the specified color proportion information and the reference information.

2.

The image search system according to supplementary note 1, further including
- a storage unit for storing color histogram information indicating a frequency distribution of a color included in the image to be processed, wherein
- the specified color proportion information acquisition unit acquires the specified color proportion information by using the color specifying information and the color histogram information.

3.

The image search system according to supplementary note 1 or 2, wherein
- the image to be processed is a partial image acquired by cutting an area of a search target object within an original image into a predetermined shape.

4.

The image search system according to any one of supplementary notes 1 to 3, further including
- a color correction unit that corrects the plurality of colors associated with the color specifying information by using preset information.

5.

The image search system according to supplementary note 4, wherein
- the color correction unit changes the preset information according to a generation condition of the image to be processed.

6.

The image search system according to any one of supplementary notes 1 to 5, wherein
- the search key information acquisition unit acquires a plurality of sets of the color specifying information and the reference information,
- the specified color proportion information acquisition unit acquires the specified color proportion information for each of the plurality of sets by using the color specifying information of the each set, and
- the image search unit identifies the search target image by using the specified color proportion information for the each set and the reference information for the each set.

7.

The image search system according to any one of supplementary notes 1 to 6, wherein
- the search key information acquisition unit acquires the color specifying information and the reference information for each predefined partial area of an image,
- the specified color proportion information acquisition unit acquires the specified color proportion information for the each partial area by using the color specifying information for the each partial area, and
- the image search unit identifies the search target image by using the specified color proportion information for the each partial area and the reference information for the each partial area.

8.

The image search system according to any one of supplementary notes 1 to 7, wherein
- the search key information acquisition unit acquires the color specifying information, based on selection input on a color pallet or a color plane being displayed as a user interface.

9.

An image search method executed by a computer, the method including:
- acquiring color specifying information indicating a plurality of colors and reference information indicating a reference of proportions of the plurality of colors being occupied in an image area;
- acquiring specified color proportion information indicating proportions of the plurality of colors associated with the color specifying information, being occupied in an image to be processed; and
- identifying whether the image to be processed is a search target image, based on the specified color proportion information and the reference information.

10.

The image search method executed by the computer according to supplementary note 9, the method further including:
- storing color histogram information indicating a frequency distribution of a color included in the image to be processed; and
- acquiring the specified color proportion information by using the color specifying information and the color histogram information.

11.

The image search method according to supplementary note 9 or 10, the method further including
- the image to be processed being a partial image acquired by cutting an area of a search target object within an original image into a predetermined shape.

12.

The image search method executed by the computer according to any one of supplementary notes 9 to 11, the method further including,
- correcting the plurality of colors associated with the color specifying information by using preset information.

13.

The image search method according to supplementary note 12, the method further including,
- changing the preset information according to a generation condition of the image to be processed.

14.

The image search method executed by the computer according to any one of supplementary notes 9 to 13, the method further including:
- acquiring a plurality of sets of the color specifying information and the reference information;
- acquiring the specified color proportion information for each of the plurality of sets by using the color specifying information of the each set; and
- identifying the search target image by using the specified color proportion information for the each set and the reference information for the each set.

15.

The image search method executed by the computer according to any one of supplementary notes 9 to 14, the method further including:
- acquiring the color specifying information and the reference information for each predefined partial area of an image;
- acquiring the specified color proportion information for the each partial area by using the color specifying information for the each partial area; and
- identifying the search target image by using the specified color proportion information for the each partial area and the reference information for the each partial area.

16.

The image search method executed by the computer according to any one of supplementary notes 9 to 15, the method further including, acquiring the color specifying information, based on selection input on a color pallet or a color plane being displayed as a user interface.

17. A program causing a computer to execute the image search method according to any one of supplementary notes 9 to 16.

This application is based upon and claims the benefit of priority from Japanese patent application No. 2018-165643, filed on Sep. 5, 2018, the disclosure of which is incorporated herein in its entirety by reference.

What is claimed is:

1. An image search system, comprising:
   at least one memory configured to store instructions; and
   at least one processor configured to execute the instructions to perform operations comprising:
   acquiring color specifying information indicating a plurality of colors and reference information indicating a reference of proportions of the plurality of colors in an image area of an image;
   correcting the plurality of colors associated with the color specifying information by using preset information determined according to a generation condition of the image;
   acquiring specified color proportion information indicating the proportions of the plurality of colors associated with the color specifying information after correction by the preset information; and
   identifying whether the image is a search target image, based on the specified color proportion information and the reference information.

2. The image search system according to claim 1, wherein the operations comprise:
   storing color histogram information indicating a frequency distribution of the colors included in the image, and
   acquiring the specified color proportion information by using the color specifying information and the color histogram information.

3. The image search system according to claim 1, wherein the image is a partial image acquired by cutting an area of a search target object within an original image into a predetermined shape.

4. The image search system according to claim 1, wherein the operations comprise:
   acquiring a plurality of sets of the color specifying information and the reference information;
   acquiring the specified color proportion information for each of the plurality of sets by using the color specifying information of each set; and
   identifying the search target image by using the specified color proportion information for each set and the reference information for each set.

5. The image search system according to claim 1, wherein the operations comprise:
   acquiring the color specifying information and the reference information for each of a plurality of predefined partial areas of the image,
   acquiring the specified color proportion information for each partial area by using the color specifying information for each partial area; and
   identifying the search target image by using the specified color proportion information for each partial area and the reference information for each partial area.

6. The image search system according to claim 1, wherein the operations comprise:
   acquiring the color specifying information, based on selection input on a color palette or a color plane being displayed as a user interface.

7. The image search system according to claim 1, wherein the preset information defines color correction values for each of a plurality of environments in which the image is generated.

8. An image search method executed by a computer, the method comprising:
   acquiring color specifying information indicating a plurality of colors and reference information indicating a reference of proportions of the plurality of colors in an image area of an image;
   correcting the plurality of colors associated with the color specifying information by using preset information determined according to a generation condition of the image;
   acquiring specified color proportion information indicating proportions of the plurality of colors associated with the color specifying information after correction by the preset information; and
   identifying whether the image to be processed is a search target image, based on the specified color proportion information and the reference information.

9. The image search method executed by the computer according to claim 8, the method further comprising:
   storing color histogram information indicating a frequency distribution of the colors included in the image to be processed; and
   acquiring the specified color proportion information by using the color specifying information and the color histogram information.

10. The image search method according to claim 8, wherein
    the image to be processed being a partial image acquired by cutting an area of a search target object within an original image into a predetermined shape.

11. The image search method executed by the computer according to claim 8, the method further comprising:
    acquiring a plurality of sets of the color specifying information and the reference information;
    acquiring the specified color proportion information for each of the plurality of sets by using the color specifying information of each set; and
    identifying the search target image by using the specified color proportion information for each set and the reference information for each set.

12. The image search method executed by the computer according to claim 8, the method further comprising:
    acquiring the color specifying information and the reference information for each of a plurality of predefined partial areas of the image;
    acquiring the specified color proportion information for each partial area by using the color specifying information for each partial area; and
    identifying the search target image by using the specified color proportion information for each partial area and the reference information for each partial area.

13. The image search method executed by the computer according to claim 8, the method further comprising:
    acquiring the color specifying information, based on selection input on a color palette or a color plane being displayed as a user interface.

14. The image search method according to claim 8, wherein the preset information defines color correction values for each of a plurality of environments in which the image processed is generated.

15. A non-transitory computer readable medium storing a program causing a computer to execute an image search method, the method comprising:
  acquiring color specifying information indicating a plurality of colors and reference information indicating a reference of proportions of the plurality of colors in an image area of an image;
  correcting the plurality of colors associated with the color specifying information by using preset information determined according to a generation condition of the image;
  acquiring specified color proportion information indicating proportions of the plurality of colors associated with the color specifying information after correction by the preset information; and
  identifying whether the image to be processed is a search target image, based on the specified color proportion information and the reference information.

16. The non-transitory computer readable medium according to claim 15, wherein the preset information defines color correction values for each of a plurality of environments in which the image processed is generated.

* * * * *